(12) United States Patent
Pellegrini et al.

(10) Patent No.: US 12,498,587 B2
(45) Date of Patent: Dec. 16, 2025

(54) HINGE FOR ELECTRONIC EYEGLASSES

(71) Applicant: LUXOTTICA S.R.L., Agordo (IT)

(72) Inventors: Daniele Pellegrini, Belluno (IT); Dino Michelon, Ponte Nelle Alpi (IT)

(73) Assignee: LUXOTTICA S.R.L., Agordo (IT)

( * ) Notice: Subject to any disclaimer, the term of this patent is extended or adjusted under 35 U.S.C. 154(b) by 375 days.

(21) Appl. No.: 18/017,341

(22) PCT Filed: Jul. 9, 2021

(86) PCT No.: PCT/IB2021/056188
§ 371 (c)(1),
(2) Date: Jan. 20, 2023

(87) PCT Pub. No.: WO2022/018558
PCT Pub. Date: Jan. 27, 2022

(65) Prior Publication Data
US 2023/0296916 A1 Sep. 21, 2023

(30) Foreign Application Priority Data
Jul. 23, 2020 (IT) .................. 102020000017815

(51) Int. Cl.
*G02C 5/22* (2006.01)
*G02C 11/00* (2006.01)
(52) U.S. Cl.
CPC ............... *G02C 5/22* (2013.01); *G02C 11/10* (2013.01)
(58) Field of Classification Search
CPC .................................. G02C 5/22; G02C 11/10
USPC ....................................................... 351/153
See application file for complete search history.

(56) References Cited

U.S. PATENT DOCUMENTS

| 7,527,374 | B2 | 5/2009 | Chou |
| 8,040,292 | B2 | 10/2011 | Ronzani et al. |
| 10,670,888 | B1 | 6/2020 | Yang et al. |
| 2015/0185505 | A1 | 7/2015 | Das et al. |

(Continued)

FOREIGN PATENT DOCUMENTS

| CN | 102141688 A | 8/2011 |
| CN | 108139597 A | 6/2018 |

(Continued)

OTHER PUBLICATIONS

European Office Action for Application No. 21 749 301.4, dated Mar. 19, 2025, 6 pages.

(Continued)

*Primary Examiner* — William R Alexander
(74) *Attorney, Agent, or Firm* — CANTOR COLBURN LLP

(57) ABSTRACT

A hinge for electronic eyeglasses includes a first hinge body adapted to be connected to a temple of a pair of eyeglasses, a second hinge body adapted to be connected to a front of the eyeglasses, its particularity residing in that it has a power supply/data cable adapted to be inserted within the temple, in order to pass through the first hinge body and the second hinge body and be redirected toward the front. The first hinge body is constituted by mutually spaced rings, which are adapted to intersect additional rings of the second hinge body, in order to form a set of concentric rings, at least some of the concentric rings being adapted to be mutually connected by a retention pin.

14 Claims, 19 Drawing Sheets

(56) References Cited

U.S. PATENT DOCUMENTS

| | | | |
|---|---|---|---|
| 2017/0242276 A1* | 8/2017 | Willey | H01R 35/04 |
| 2018/0252940 A1 | 9/2018 | Rabut | |
| 2019/0129200 A1 | 5/2019 | Moskowitz et al. | |
| 2019/0235274 A1 | 8/2019 | Jouard et al. | |
| 2022/0155617 A1* | 5/2022 | De Smet | G02C 5/08 |
| 2022/0357598 A1* | 11/2022 | Muramatsu | G02C 7/083 |

FOREIGN PATENT DOCUMENTS

| | | |
|---|---|---|
| CN | 111213084 A | 5/2020 |
| JP | 2015522842 A | 8/2015 |
| JP | 2018528481 A | 9/2018 |
| WO | 2013188805 A2 | 12/2013 |
| WO | 2017051092 A1 | 3/2017 |

OTHER PUBLICATIONS

Japanese Office Action for Application No. 2023-504438, dated Jan. 20, 2025, 10 pages with translation.
International Search Report for International Application No. PCT/IB2021/056188, Inernational Filing Date Jul. 9, 2021, Date of Mailing Oct. 18, 2021, 5 pages.
Written Opinion for International Application No. PCT/IB2021/056188, Inernational Filing Date Jul. 9, 2021, Date of Mailing Oct. 18, 2021, 7 pages.
Chinese Office Action for Application No. 202180058988.5, dated Jun. 10, 2025, 8 pages, English translation.
Israel Office Action for Application No. 299635, dated Mar. 4, 2025, 5 pages with translation.
Japanese Office Action for Application No. 2023-504438, dated Jul. 15, 2025, 4 pages, English translation.

* cited by examiner

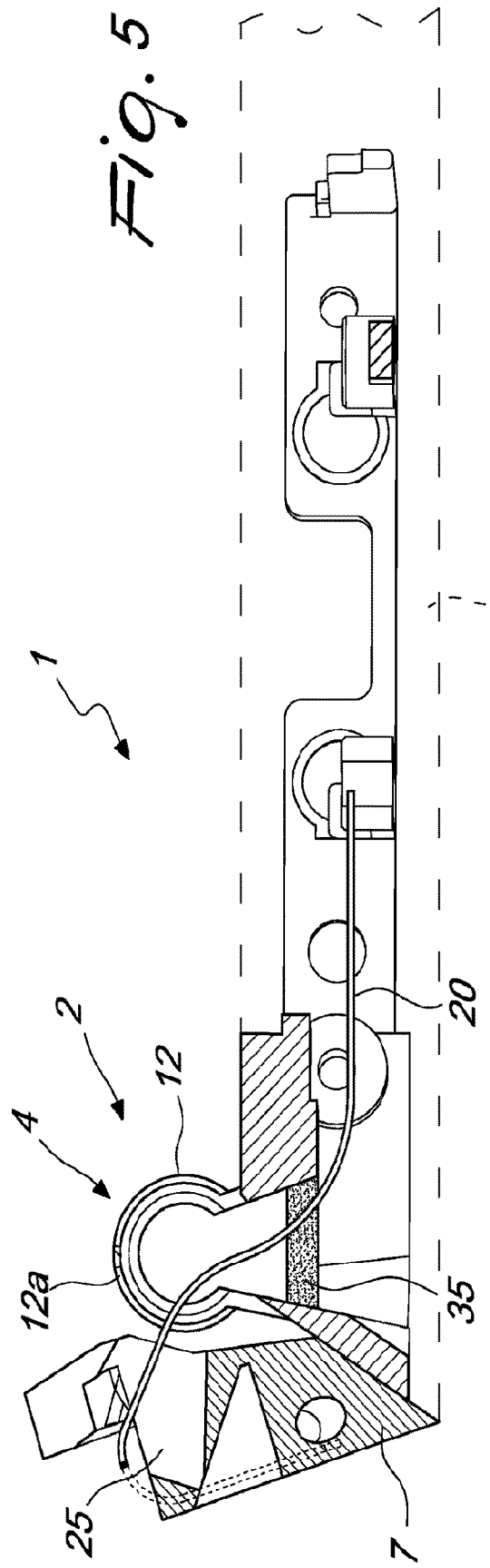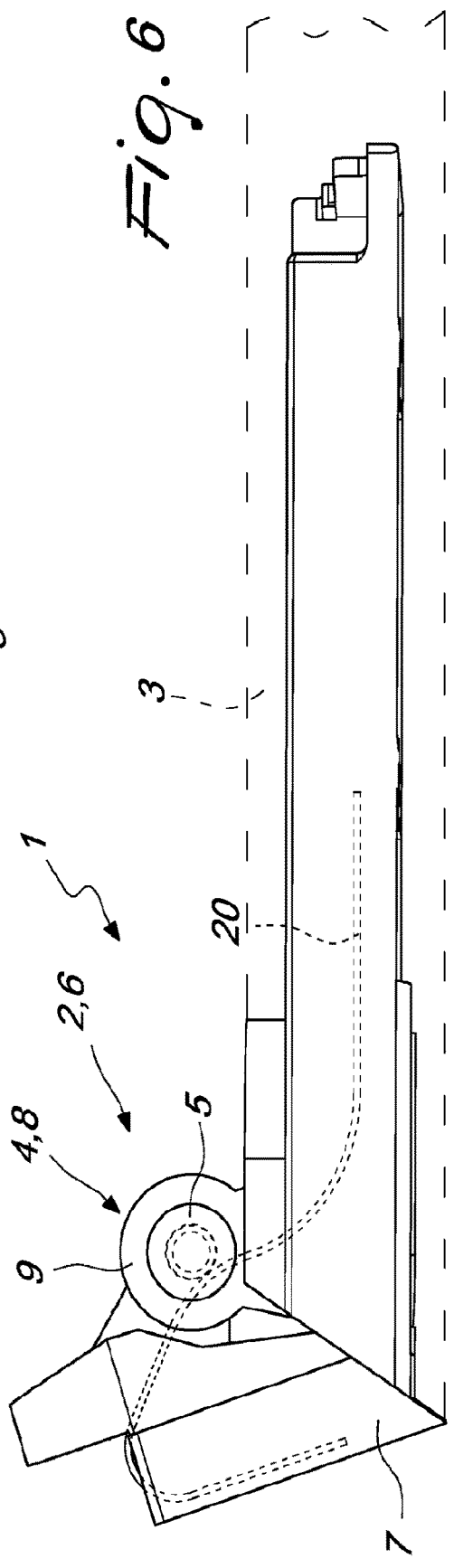

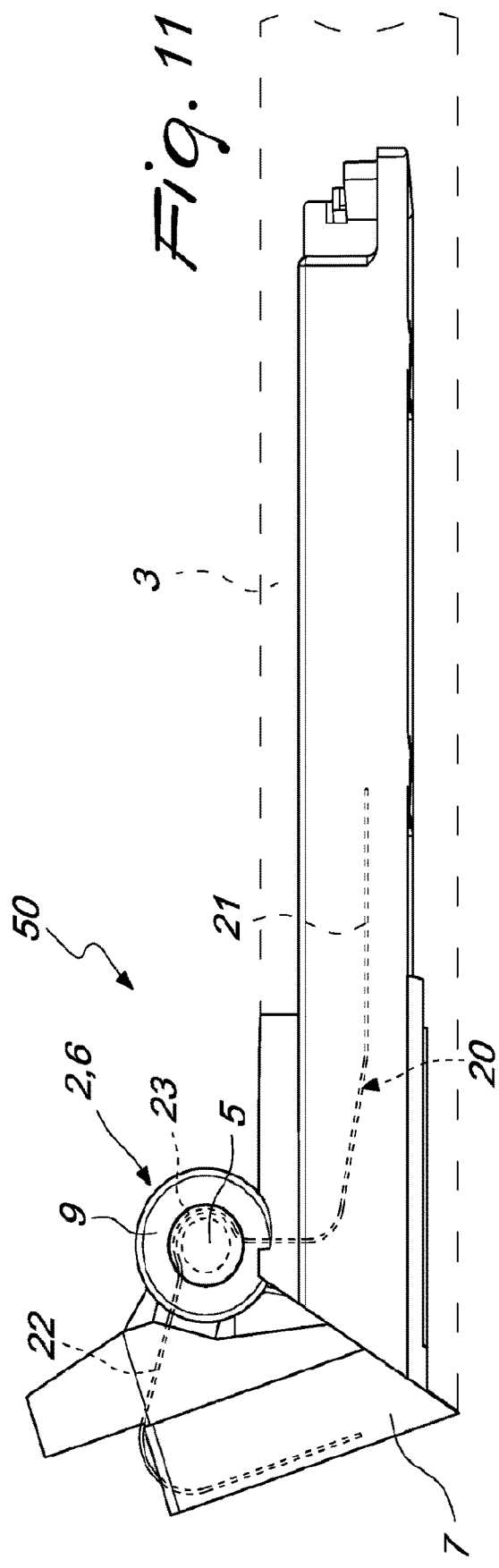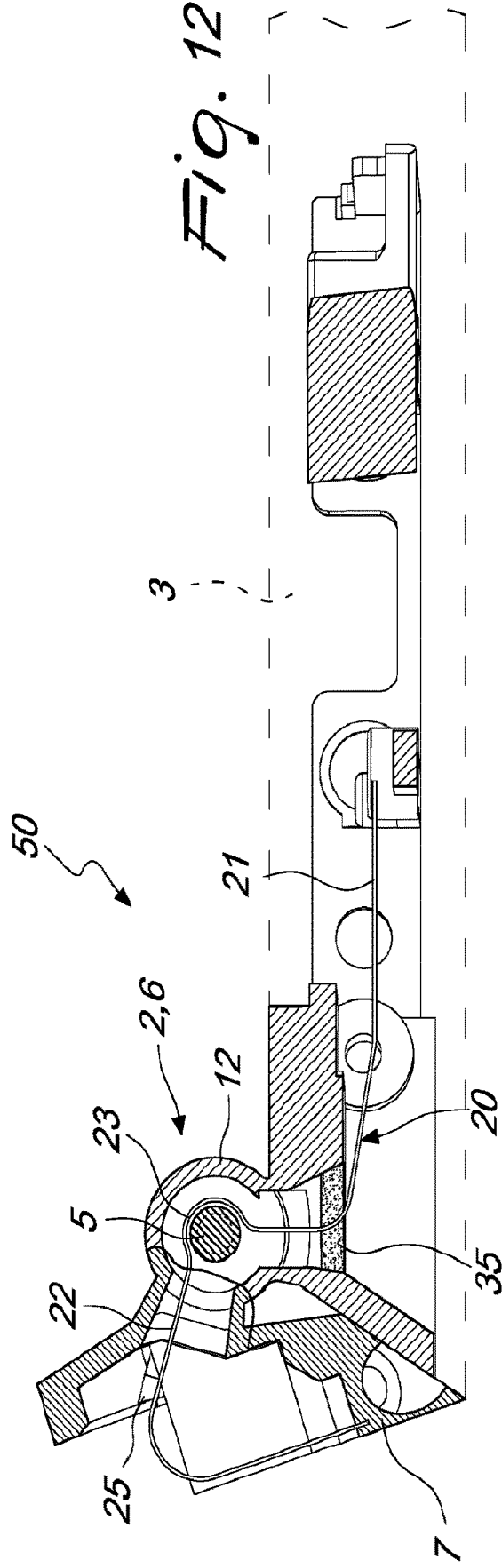

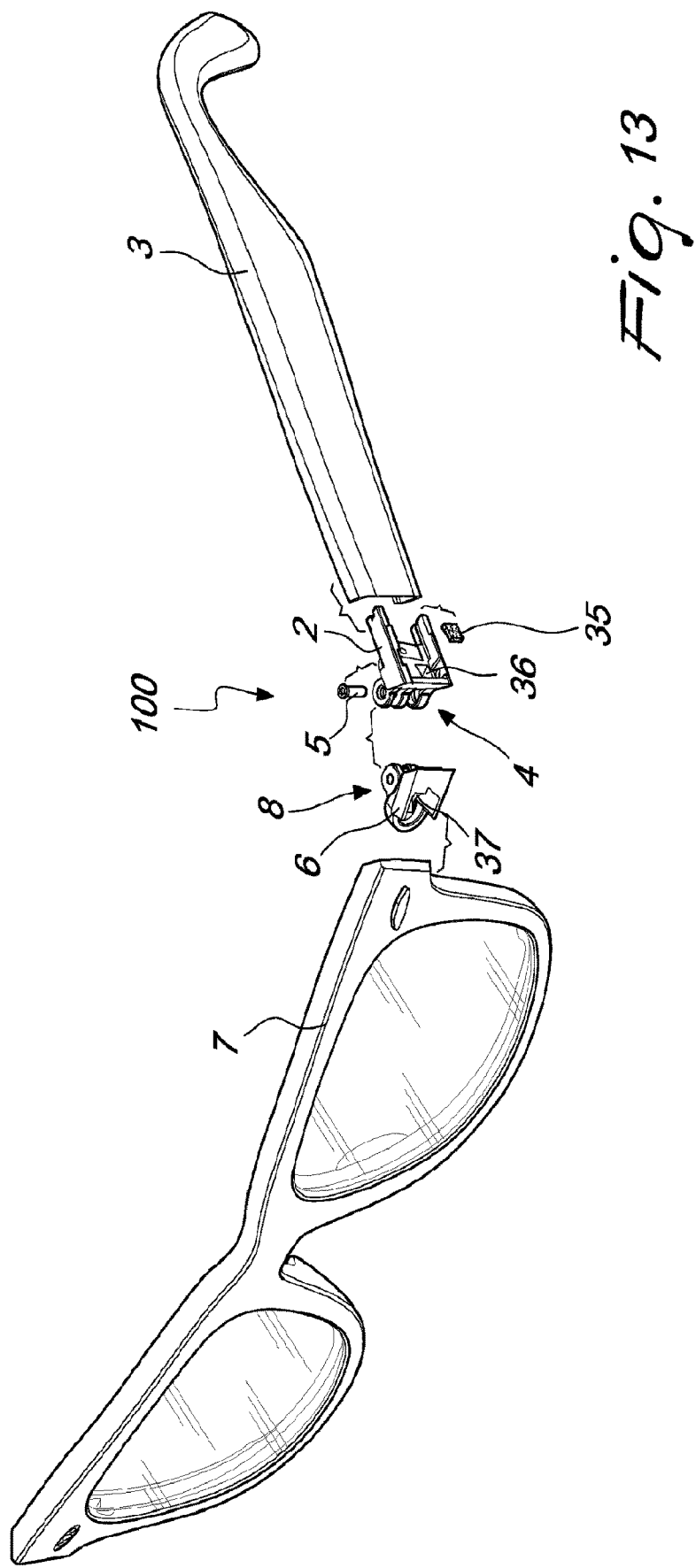

HINGE FOR ELECTRONIC EYEGLASSES

CROSS-REFERENCE TO RELATED APPLICATIONS

The present application is a 35 U.S.C. § 371 National Stage patent application of International patent application PCT/IB2021/056188, filed on 9 Jul. 2021, which claims priority to Italian patent application 102020000017815, filed on 23 Jul. 2020.

TECHNICAL FIELD

The present disclosure relates to a hinge for electronic eyeglasses. More particularly, the disclosure relates to a hinge for electronic eyeglasses which allows an optimum placement of the signal/data cable (ribbon cable) within the hinge.

The hinge according to the disclosure can be used advantageously also for electrochromic eyeglasses.

BACKGROUND

As is known, electronic eyeglasses are increasingly commercially widespread, and this term refers to eyeglasses which have a still camera, a video camera, a temperature sensor, a pressure sensor, etcetera. Essentially, electronic eyeglasses are eyeglasses that allow the user to acquire environmental data such as images, videos, temperature, pressure values, etcetera. The particularity of these eyeglasses resides in that the electronic device, which is normally arranged at the front of the eyeglasses (for example as in the case of a still camera/video camera), or is arranged within the temple, is conveniently powered by a battery which is normally concealed within the temple of the eyeglasses, and has a connection between the battery and the electronic device that is provided by means of a power supply/data cable, which also must be concealed within the temple.

The problem occurs when the electronic device is located in the front of the eyeglasses and the power supply/data cable must pass from the temple to the front of the eyeglasses in order to be able to supply power and/or carry data to said electronic device.

In this case, the cable is normally subjected to bendings, torsions, jamming at pointed portions of the hinge, with consequent risk of tearing the cable, and in any case of damage to said cable with prolonged use of the electronic eyeglasses.

Currently, no solutions are known for making the cable pass in an optimal manner from the temple to the front, bypassing the hinge portion that constitutes the most significant obstacle to the connection of the electronic device arranged in the front of the eyeglasses to the battery which is accommodated within the temple body.

SUMMARY

The aim of the present disclosure is to provide a hinge for electronic eyeglasses that has an optimum passage of the power supply/data cable from the temple to the front of the eyeglasses, avoiding as much as possible damage to said cable.

Within this aim, the present disclosure provides a hinge for electronic eyeglasses in which the passage of the power supply/data cable from the temple to the front of the eyeglasses occurs in a manner which allows the cable to not have excessive bends and/or options which in the long term damage its integrity.

the present disclosure also provides a hinge for electronic eyeglasses in which the power supply/data cable is substantially concealed within the body of the hinge, becoming practically invisible to view even when the eyeglasses are seen from the inner part of the coupling between the temple and the front.

The present disclosure further provides a hinge for electronic eyeglasses that can be disassembled easily without entailing damage to the power supply/data cable.

The present disclosure also provides a hinge for electronic eyeglasses that is highly reliable, relatively simple to provide and at competitive costs.

This aim, as well as these and other advantages which will become better apparent hereinafter, are achieved by providing a hinge for electronic eyeglasses, comprising a first hinge body adapted to be connected to a temple of a pair of eyeglasses, a second hinge body adapted to be connected to a front of the eyeglasses, characterized in that it comprises a power supply/data cable adapted to be inserted within said temple, in order to pass through said first hinge body and said second hinge body and be redirected toward said front, and in that said first hinge body is constituted by a plurality of mutually spaced rings, which are adapted to intersect a plurality of rings of said second hinge body, in order to form a plurality of concentric rings, at least some of said concentric rings being adapted to be mutually connected by means of a retention pin.

BRIEF DESCRIPTION OF THE DRAWINGS

Further characteristics and advantages of the disclosure will become better apparent from the description of preferred but not exclusive embodiments of the hinge according to the disclosure, illustrated by way of non-limiting example in the accompanying drawings, wherein:

FIG. 5 is a transverse sectional view of the coupled hinge of FIGS. 3 and 4;

FIG. 6 is a top plan view of the assembled hinge of FIGS. 3, 4 and 5;

FIG. 11 is a top plan view of the assembled hinge of FIGS. 9 and 10;

FIG. 12 is a transverse sectional view of the coupled hinge of FIGS. 9, 10 and 11;

FIG. 13 is an exploded perspective view of a third embodiment of the hinge according to the disclosure applied to eyeglasses;

DETAILED DESCRIPTION OF THE DRAWINGS

Figure 1:
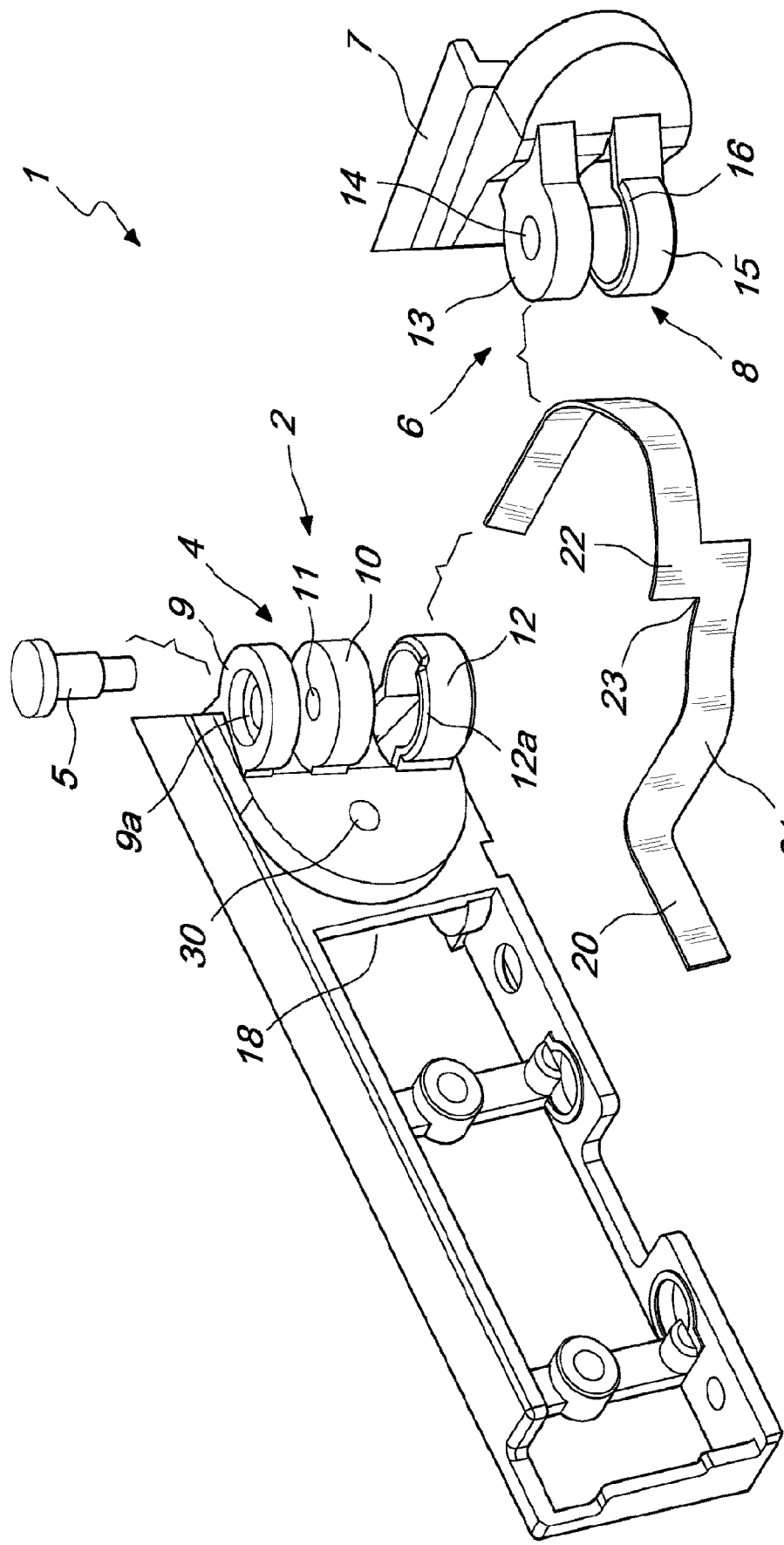
FIG. 1 is an exploded perspective view of the hinge according to the disclosure, coupled to a temple portion and to a front portion of the eyeglasses, according to a first embodiment of the present disclosure.
Figure 2:
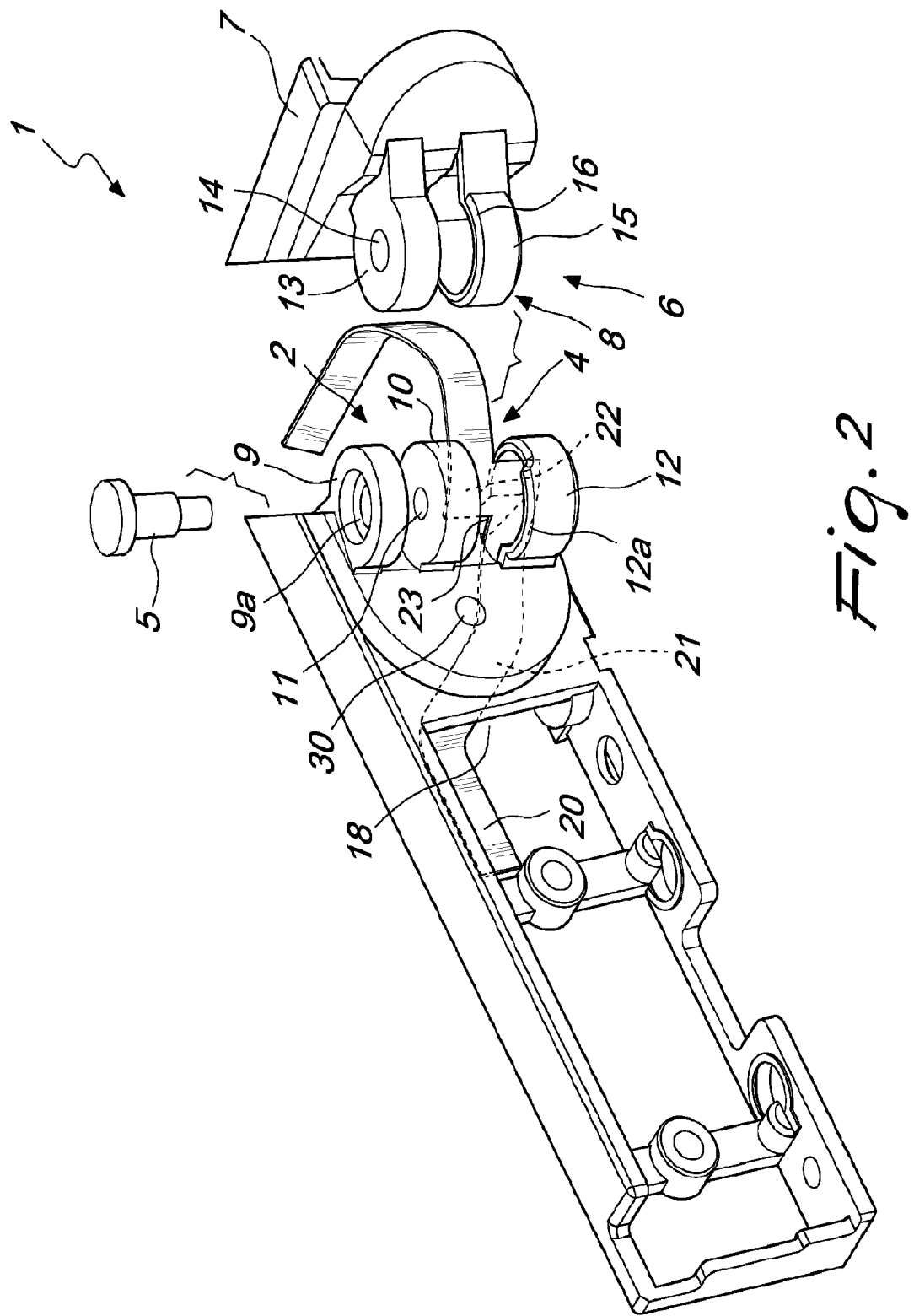
FIG. 2 is an exploded perspective view of the hinge according to the disclosure with the power supply/data cable inserted.
Figure 3:
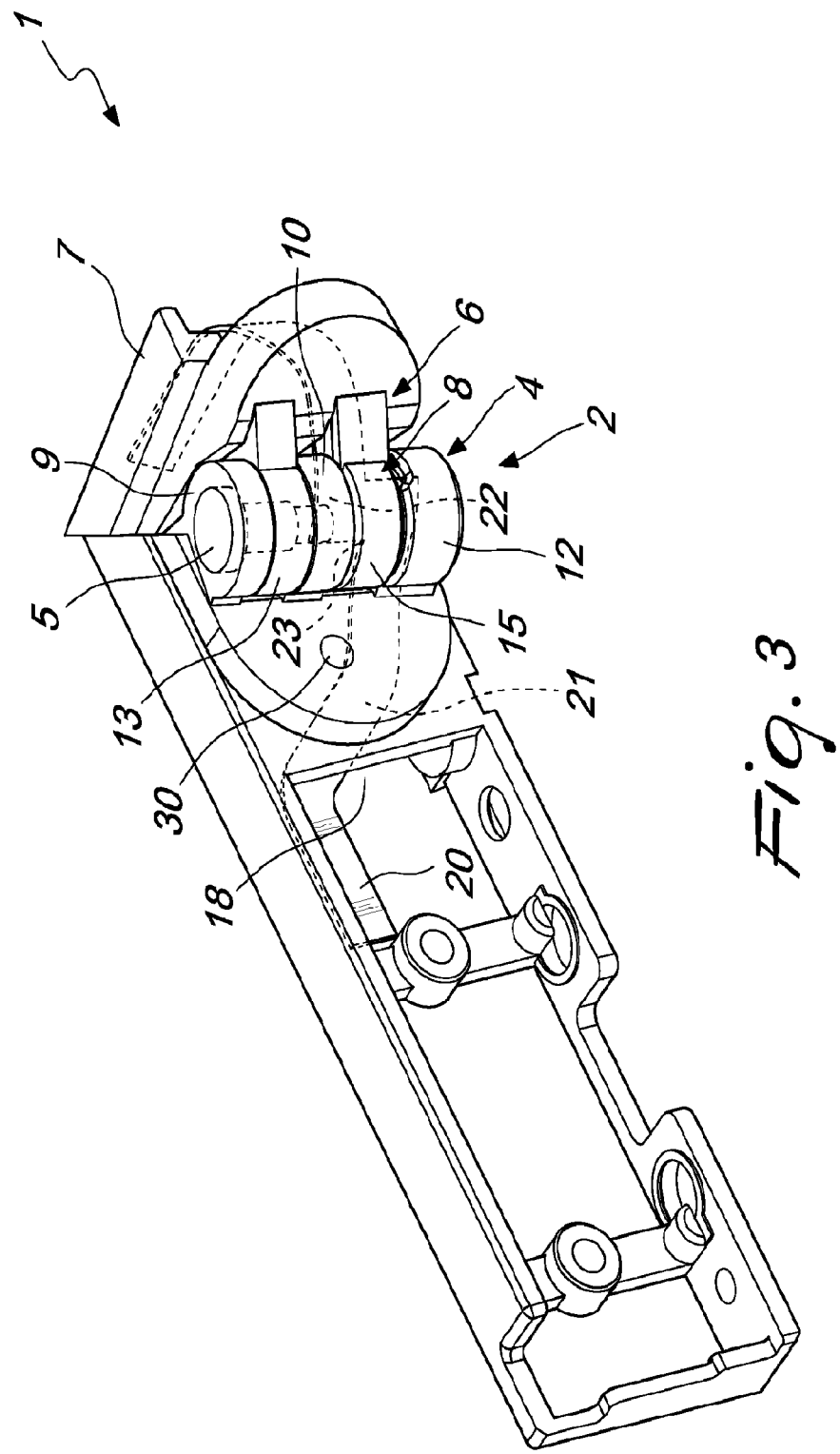
FIG. 3 is a perspective view of the coupling of the hinge according to the present disclosure with the temples and the front of the eyeglasses, in the configuration for use.
Figure 4:
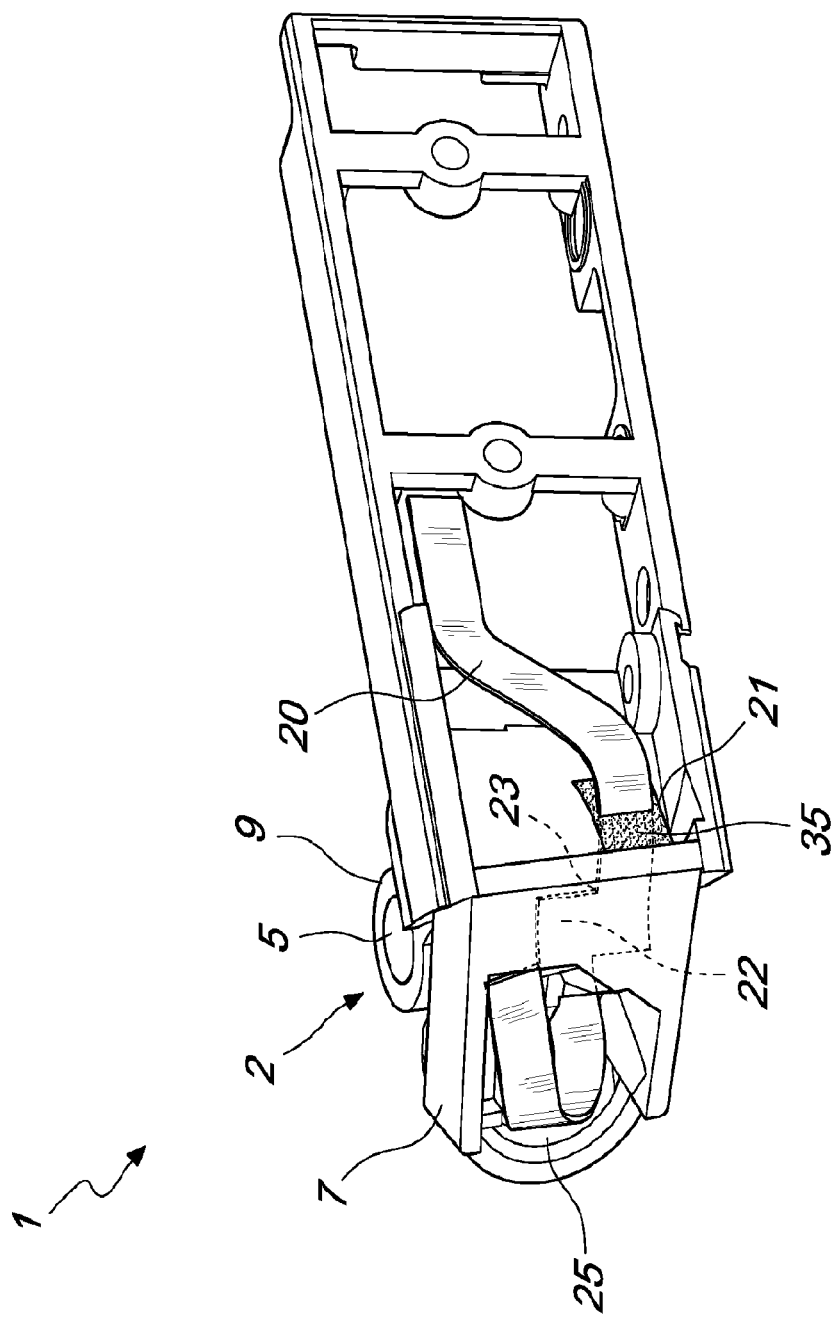
FIG. 4 is a perspective view of the assembled hinge of FIG. 3 from the opposite side.
Figure 7:
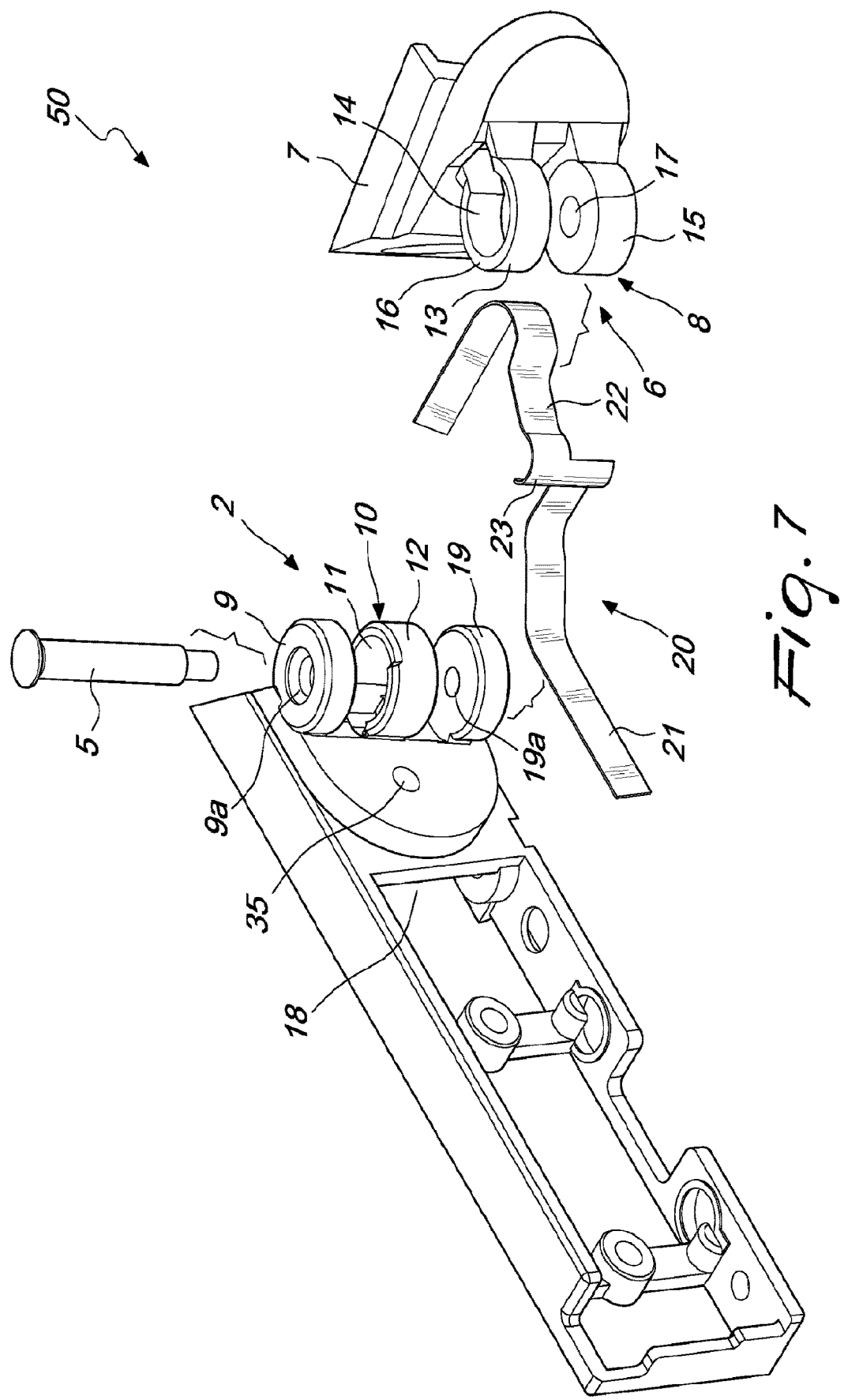
FIG. 7 is an exploded perspective view of the hinge according to the disclosure, coupled to a temple portion and to a front portion of the eyeglasses, according to a second embodiment of the present disclosure.
Figure 8:
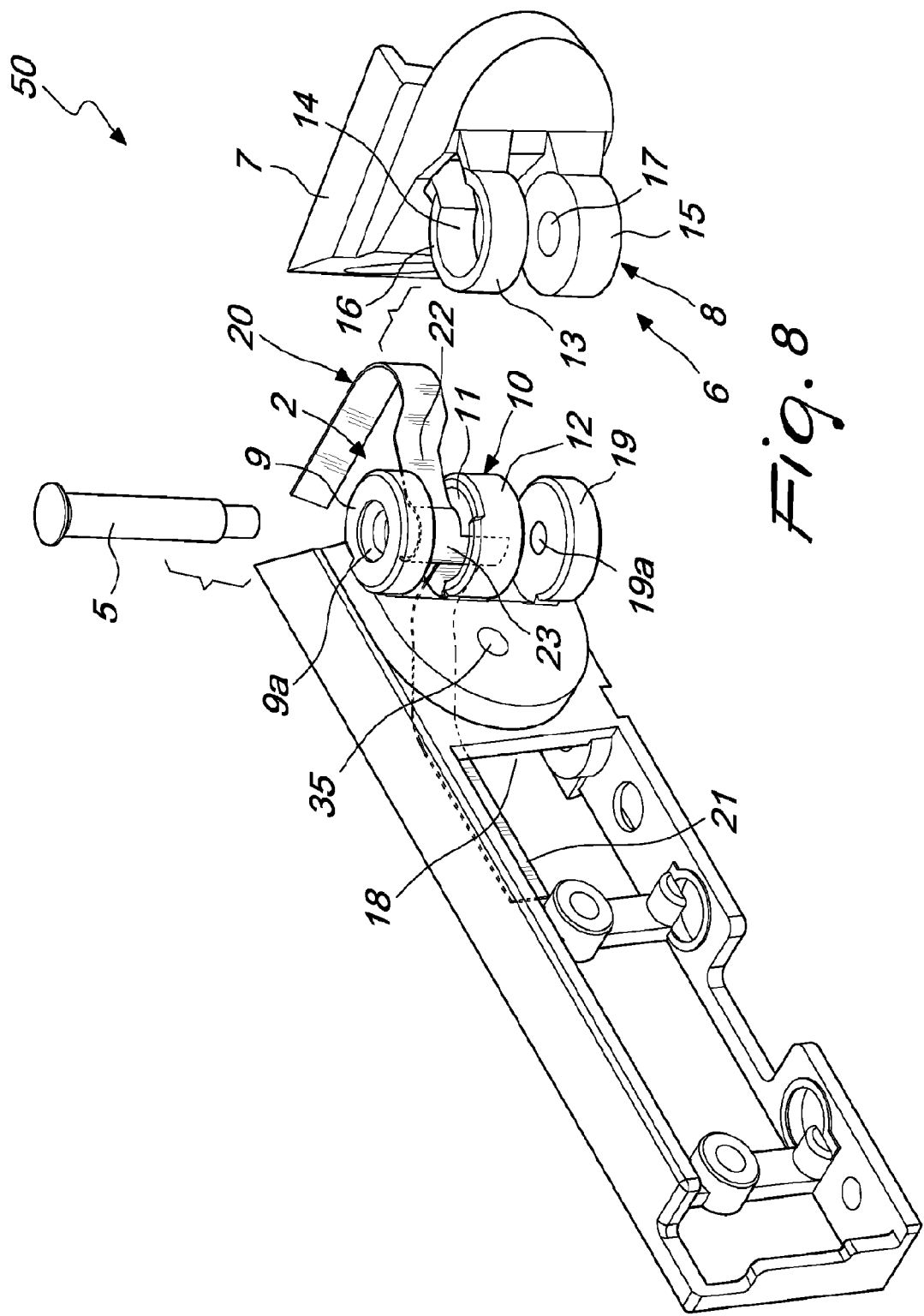
FIG. 8 is an exploded perspective view of the hinge of FIG. 7, with the power supply/data cable inserted.
Figure 9:
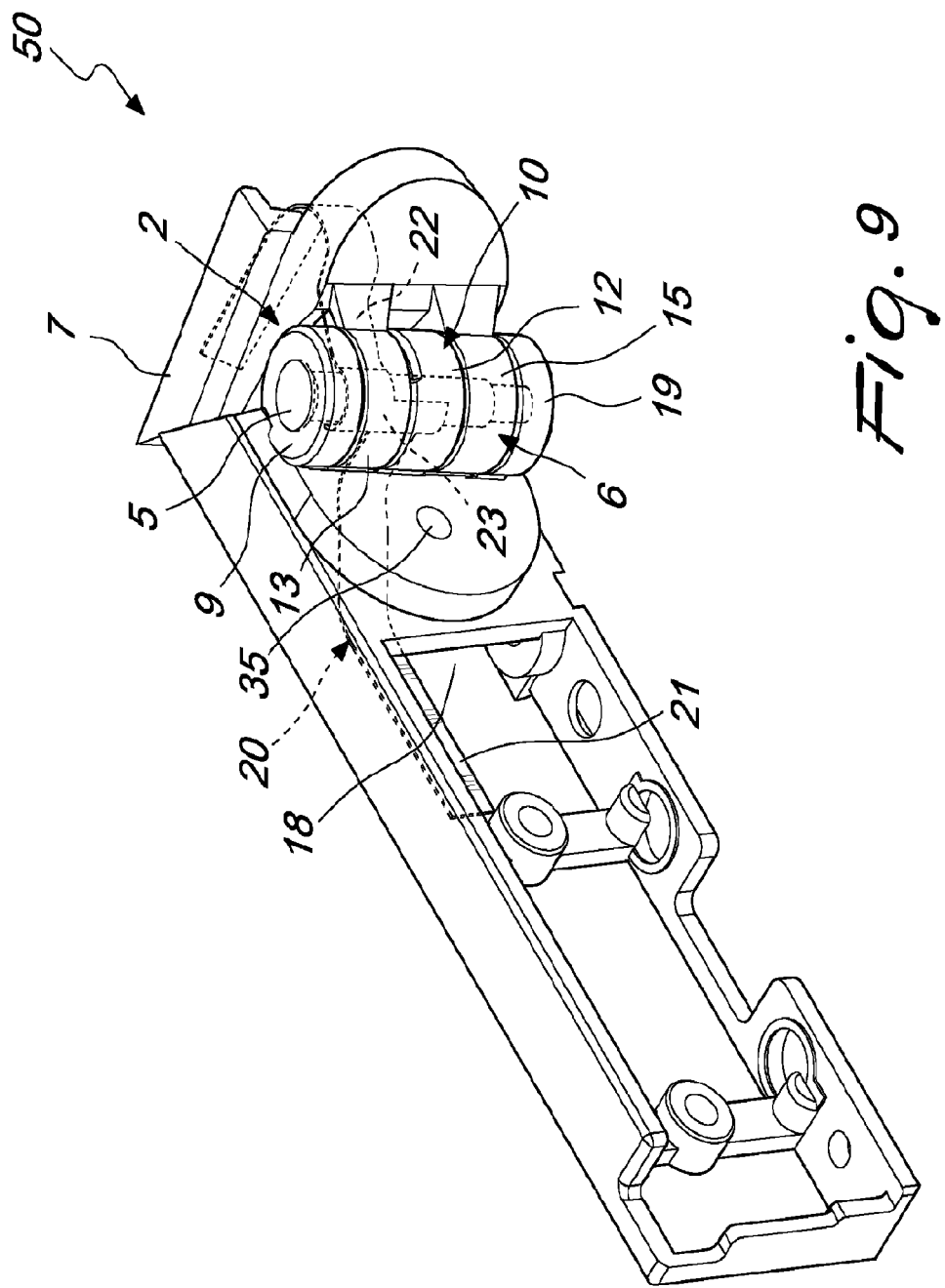
FIG. 9 is a perspective view of the coupling of the hinge of FIGS. 7 and 8 with the temples and the front of the eyeglasses, in the configuration for use.
Figure 10:
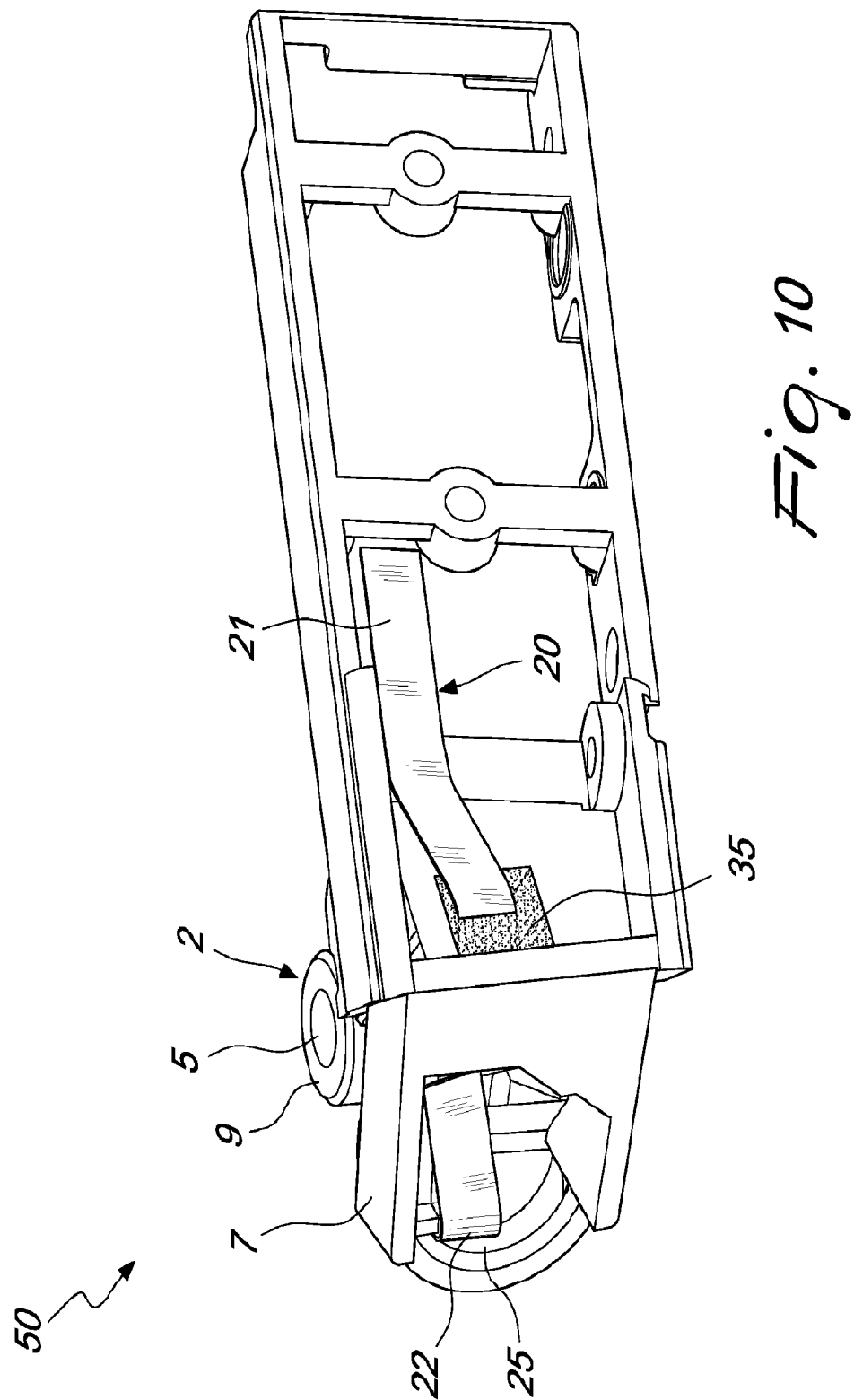
FIG. 10 is a perspective view of the assembled hinge of FIG. 9 from the opposite side.
Figure 14:
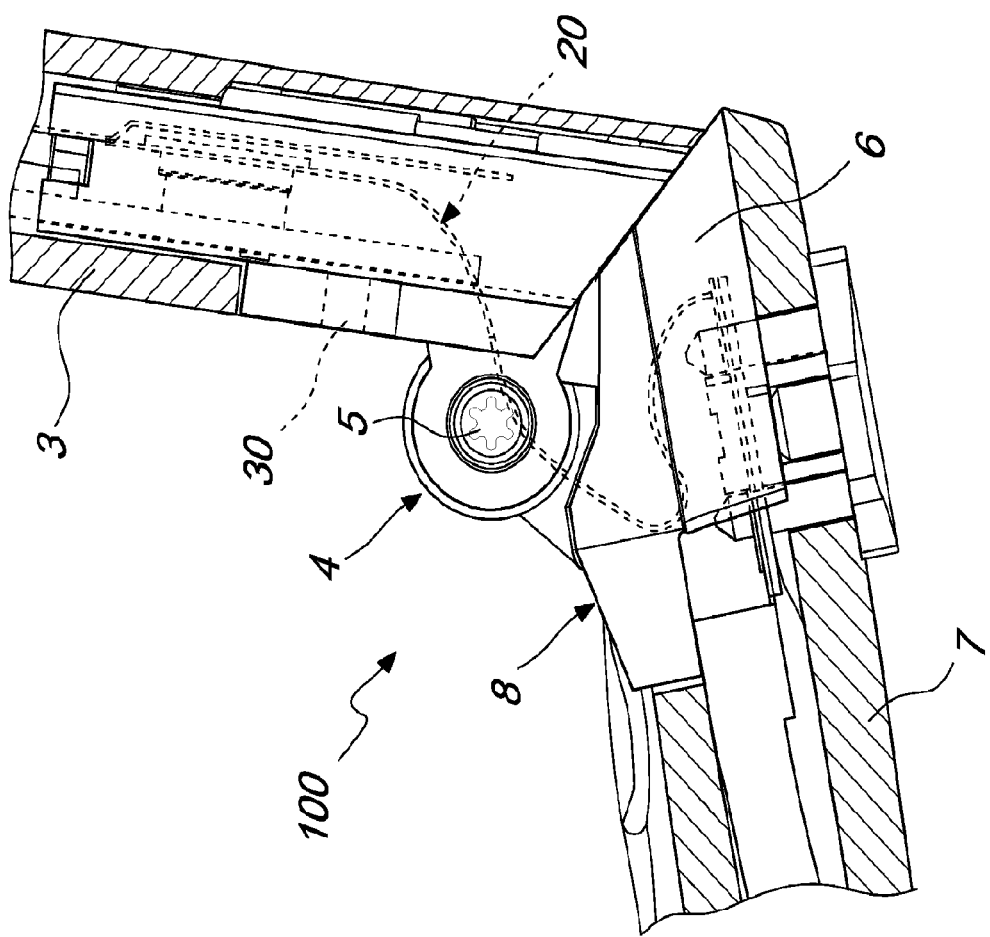
FIG. 14 is a longitudinal sectional view of the hinge according to the present disclosure.
Figure 15:
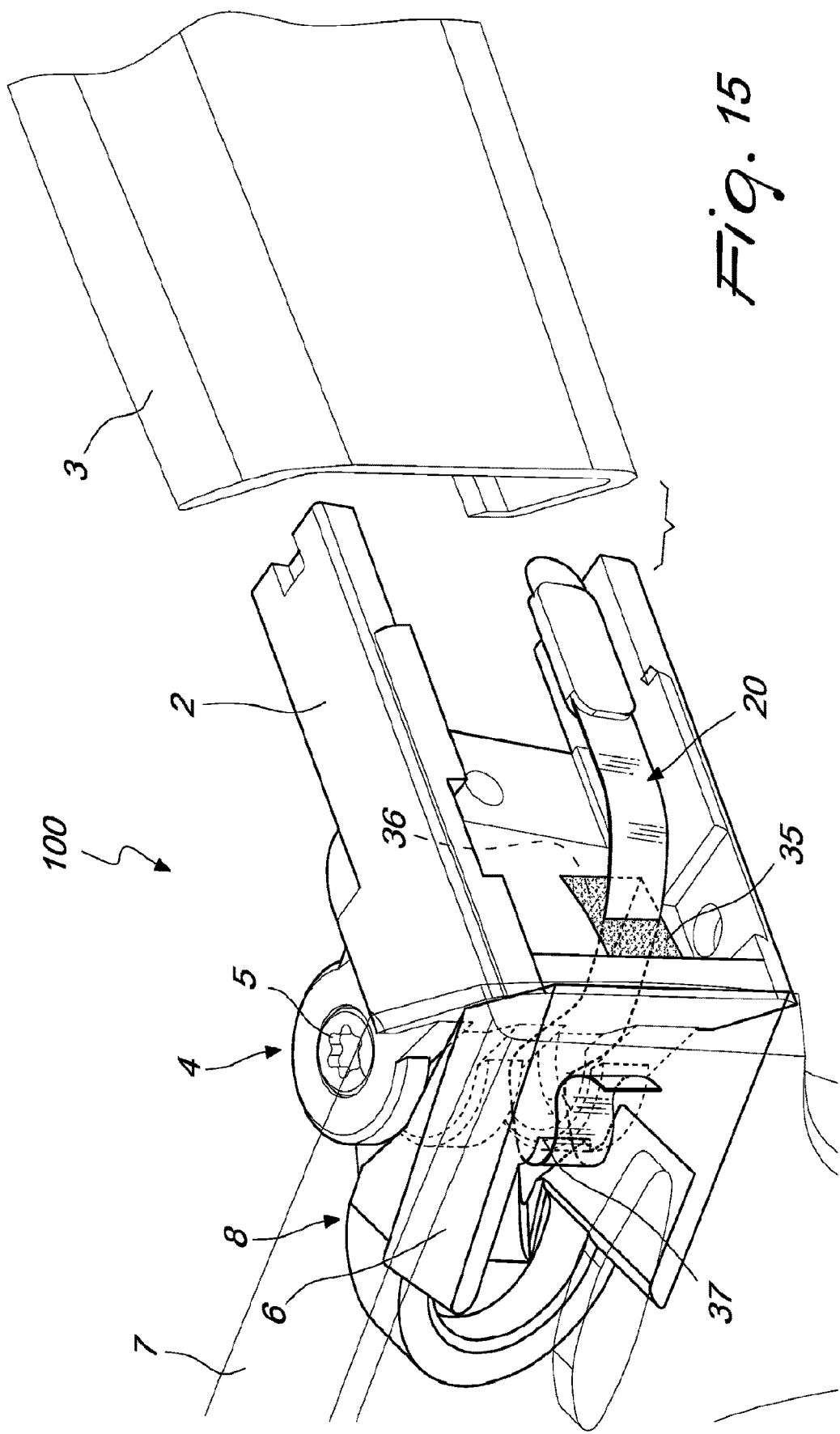
FIG. 15 is an enlarged-scale perspective view of the hinge according to the disclosure in a first configuration.
Figure 16:
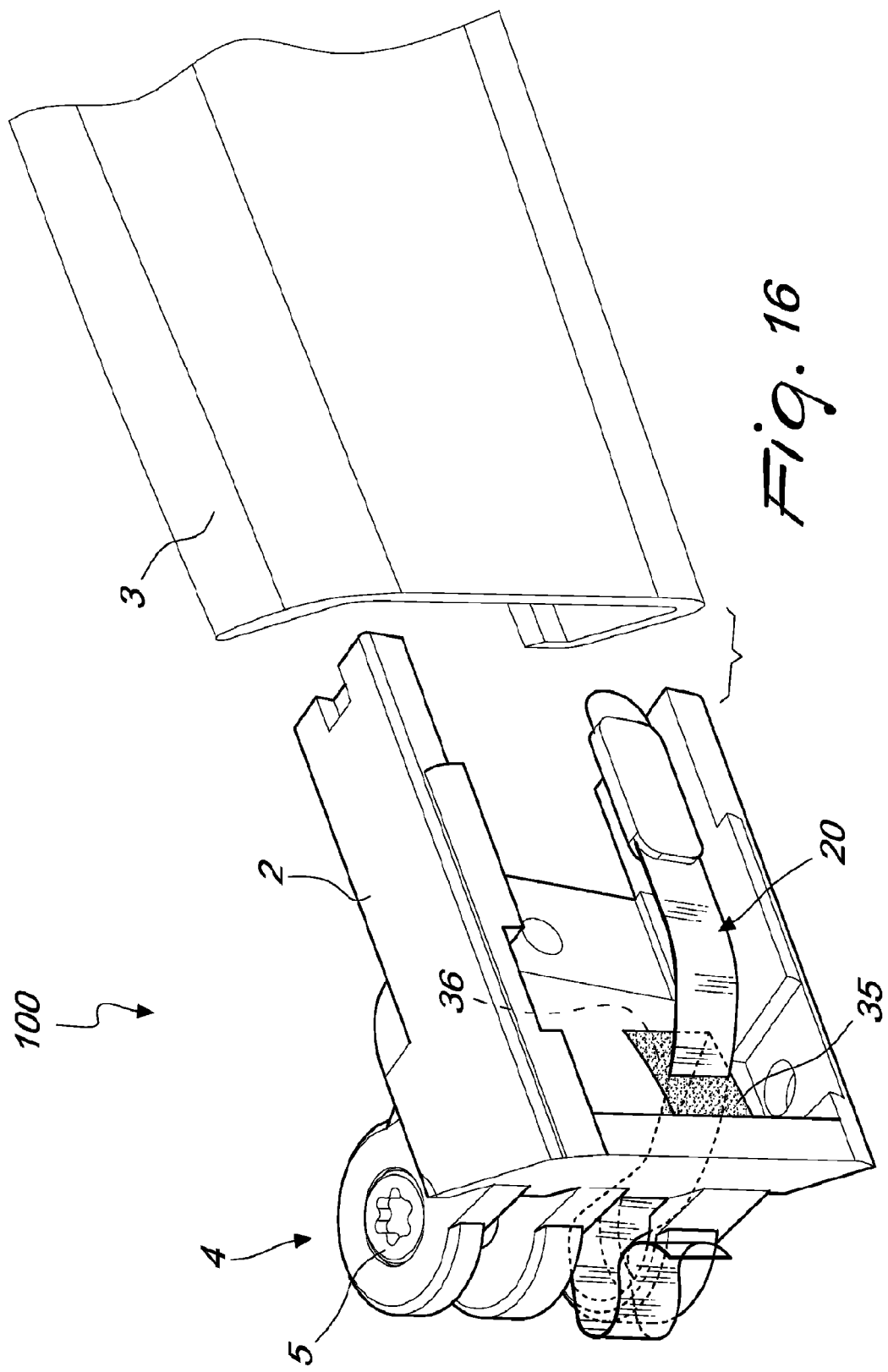
FIG. 16 is an enlarged-scale perspective view of the hinge according to the disclosure in a second configuration.

With reference to the figures, in which identical reference numerals correspond to identical elements, the hinge according to the disclosure, according to a first embodiment thereof (FIGS. 1-6), generally designated by the reference numeral 1, comprises a first hinge body 2 associated with a temple 3 of a pair of eyeglasses, the first hinge body being provided so as to form a plurality of mutually spaced rings 4 which allow the passage of a locking pin 5. A second hinge body 6 is provided and connected to a front 7 of the pair of eyeglasses. The second hinge body is also formed by a plurality of mutually spaced rings 8 adapted to be inserted between the spaced rings 4 of the first hinge body 2.

The rings 4 of the first hinge body are for example three, as shown in the figures, and, starting from the top downward, i.e., from the upper temple portion 3, adapted to make contact with the upper portion of the front 7 of the eyeglasses, they comprise a first hinge ring 9, which has a central hole 9a, a second hinge ring 10, which is spaced from the first hinge ring 9 and also provided with a central hole 11, and a third hinge ring 12, which is closed in a downward region and is shaped with raised edges 12a.

The second hinge body 6 further comprises two rings, as shown by way of example in the figures, generally designated by the reference numeral 8, of which a first upper ring 13 provided with a central hole 14 and a second lower ring 15 provided with a central hole 17 and with raised edges 16.

As mentioned, the rings 8 and 4 are adapted to mutually intersect so as to form a plurality of five rings which are mutually superimposed and concentric so as to allow the passage of the retention (locking) pin 5.

The number of rings of course can vary according to the requirements, the number of five in total being an exemplifying number.

Conveniently, the temple 3 is provided internally with a longitudinal through cavity 18 which allows the passage of a power supply/data cable 20 which is conveniently shaped so as to have a first part 21 which blends with a second cable part 22 which is arranged in an upper position with respect to the first part 21, with a step 23.

The longitudinal cavity 18 of the temple 3 blends with the rings 4 of the first hinge body 2. As shown in FIG. 1, for example, there is in fact a passage formed between the rings 4 and in particular between the third lower ring 4 of the first hinge body 2 and the longitudinal cavity 18, so that the power supply/data cable 20 can be made to pass within the longitudinal cavity 18, to be then inserted through the rings 4 of the first hinge body, and therefore also through the rings 8 of the second hinge body, to be then guided through a cavity 25 of the front 7 of the eyeglasses.

In this manner, the power supply/data cable 20 passes at the upper region of the temple 3 and then flexes downward by virtue of a downward curve which is formed at the first part 21 of the cable 20 (horizontal part of the first part 21 followed by a descending part), to then pass at the bottom or lower ring 4 of the first hinge body 2, and then pass behind the pin 5 (remaining substantially adjacent to the temple 3) which is inserted in the through holes of the hinge rings 4 and 8, and finally be redirected through the cavity 25 of the front 7 of the eyeglasses.

This particular configuration of the hinge rings and of the cavity of the temple 3, as well as of the front 7, allows to accommodate the power supply cable 20 entirely within the temple and the front portion 7 of the eyeglasses, without the cable being visible externally, passing through the hinge rings 4 and 8, which are assembled together by means of the retention pin 5.

The second embodiment of the hinge according to the disclosure, shown in FIGS. 7-12, generally designated by the reference numeral 50, comprises a first hinge body 2 associated with a temple 3 of a pair of eyeglasses, the first hinge body being provided so as to form a plurality of mutually spaced rings 4 which allow the passage of a locking pin 5. A second hinge body 6 is provided and connected to a front 7 of the eyeglasses. The second hinge body is also formed by a plurality of mutually spaced rings 8 adapted to be inserted between the spaced rings 4 of the first hinge body 2.

The rings 4 of the first hinge body are for example three, as shown in the figures, and starting from the top downward, i.e., from the upper temple portion 3, adapted to make contact with the upper portion of the front 7 of the eyeglasses, comprise a first hinge ring 9 which has a central hole 9a, a second hinge ring 10, which is spaced from the first hinge ring 9 and is also provided with a central hole 11 with raised edges 12, and a third hinge ring 19 with a central hole 19a.

The second hinge body 6 further comprises two rings, as shown by way of example in the figures, of which a first upper ring 13 is provided with a central hole 14 and a second lower ring 15 is provided with a central hole and with raised edges 16.

As mentioned, the rings 8 and 4 are adapted to be mutually intersected so as to form a plurality of five mutually superimposed and concentric rings, so as to allow the passage of the retention (locking) pin 5.

The number of the rings is of course variable according to the requirements, the number of five in total being an exemplifying number.

Conveniently, the temple 3 is provided internally with a longitudinal through cavity 18 which allows the passage of a power supply/data cable 20 which is conveniently shaped so as to have a first part 21 which blends with a second cable part 22 which is arranged in an upper position with respect to the first part 21, with a step 23.

The longitudinal cavity 18 of the temple 3 blends with the rings 4 of the first hinge body 2. As shown in FIG. 1, for example, there is in fact a passage formed between the rings 4 and in particular between the second ring 10 of the first hinge body 2 and the longitudinal cavity 18 so that the power supply/data cable 20 can be made to pass within the longitudinal cavity 18, to be then inserted through the rings 4 of the first hinge body and therefore also through the rings 8 of the second hinge body, passing around the retention pin 5, to be then guided through a cavity 25 of the front 7 of the eyeglasses.

In this manner, the power supply/data cable 20 passes at the upper region of the temple 3, to then pass at the space that exists between the second ring 10 and the cavity 18 of the temple 3 and pass around the pin 5, the cable 20 being contained with its step 23 within the raised walls 12 of the ring 10 and 16 of the ring 13, to be finally redirected through the cavity 25 of the front 7 of the eyeglasses.

This particular configuration of the hinge rings and of the cavity of the temple 3, and of the front 7, allows to accommodate the power supply cable 20 entirely within the temple and the front portion 7 of the eyeglasses, without the cable being visible externally, passing through the hinge rings 4 and 8, which are assembled together by means of the retention pin 5.

FIGS. 13-16 show the third embodiment of the hinge according to the disclosure, generally designated by the reference numeral 100, in which the first hinge body 2 comprises multiple, in this case three, rings 4 and the second hinge body 6 comprises multiple, in this case two, rings 8.

When the two hinge bodies 2 and 6 are respectively connected to the temple 3 and to the front 7 of the eyeglasses and the temple is coupled to the front, the rings 4 and 8 mutually intersect, align and are locked by the pin 5.

The assembly, the friction and alignment of the hinge are ensured by the first rings, two rings 4 for the components 2 of the hinge and one ring 8 for the component 6 of the hinge.

The threaded pin 5 passes through the first two rings 4 and engages the third ring 8. The dimensions of these rings 4 and 8 are smaller than the fourth and fifth ring, in order to ensure the compactness of the hinge.

The flexible cable 20 passes through the fourth and fifth rings of the hinge by means of a through hole in the fourth ring (the penultimate from the bottom) and the formation of a cup-shaped region in the fifth ring, i.e., the lowest of the five rings in total.

During operation, the cable 20 always remains in a vertical position with respect to the rings (joints) of the hinge and can freely move in the space created within the hinge during the opening and closing cycles.

The insertion of the cable 20 occurs by virtue of two openings 36 and 37, which are present respectively in the first body 2 of the hinge and in the second body 6 of the hinge.

The assembly of the cable in the hinge occurs in three steps:
  the first and second bodies of the hinge are assembled by virtue of the insertion of the threaded pin 5;
  the hinge is closed/opened, approximately for half of its stroke, so that the passage path of the cable 20 is visible for the insertion of the cable;
  the contoured cable 20 and the sub-assembled electronic elements 40 are inserted, partially inclining the cable 20 with respect to the final configuration in order to facilitate its passage through the opening.

In this manner the hinge is ready to be assembled to the respective plastic parts of the frame, both from the mechanical standpoint and from the electrical standpoint, by connecting the cable 20 to the elements that are already present.

As a whole, therefore, the mechanical assembly of the hinge consists of five rings having different thickness: the first three rings can have for example a thickness comprised between 1.2 and 1.5 mm, the fourth ring can have for example a thickness of 2 mm, and the fifth ring can have a thickness of 2.25 millimeters.

These dimensions are different among the rings since they perform different functions. The first rings perform alignment around the rotation axis, the friction of the hinge in the opening and closing movements and the fastening by means of the threaded pin 5.

The fourth ring has larger dimensions and is completely hollowed out in order to allow the passage of the cable 20 inside it. Finally, the fifth ring ensures the passage of the cable 20 by means of the provision of a cup-shaped region which renders said cable 20 invisible to the user.

Figure 17:
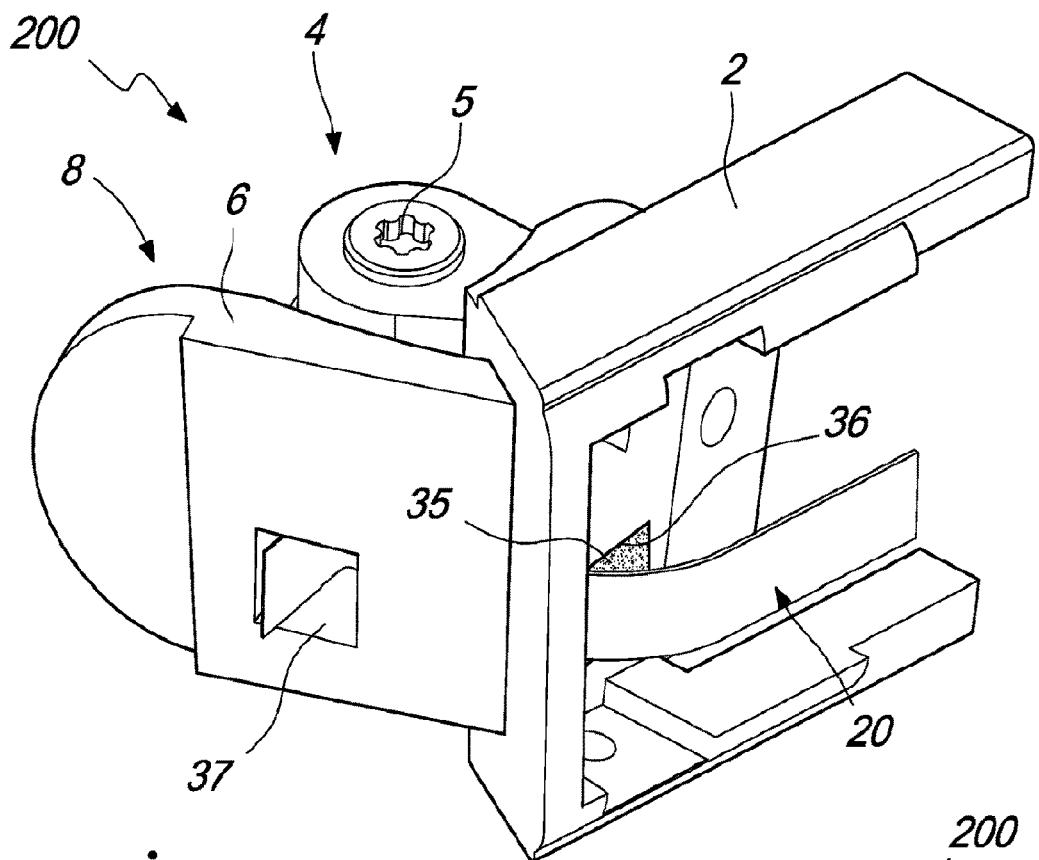
FIG. 17 is an enlarged-scale perspective view of the hinge according to the disclosure according to a fourth embodiment thereof, disassembled from the temple of the eyeglasses.
Figure 18:
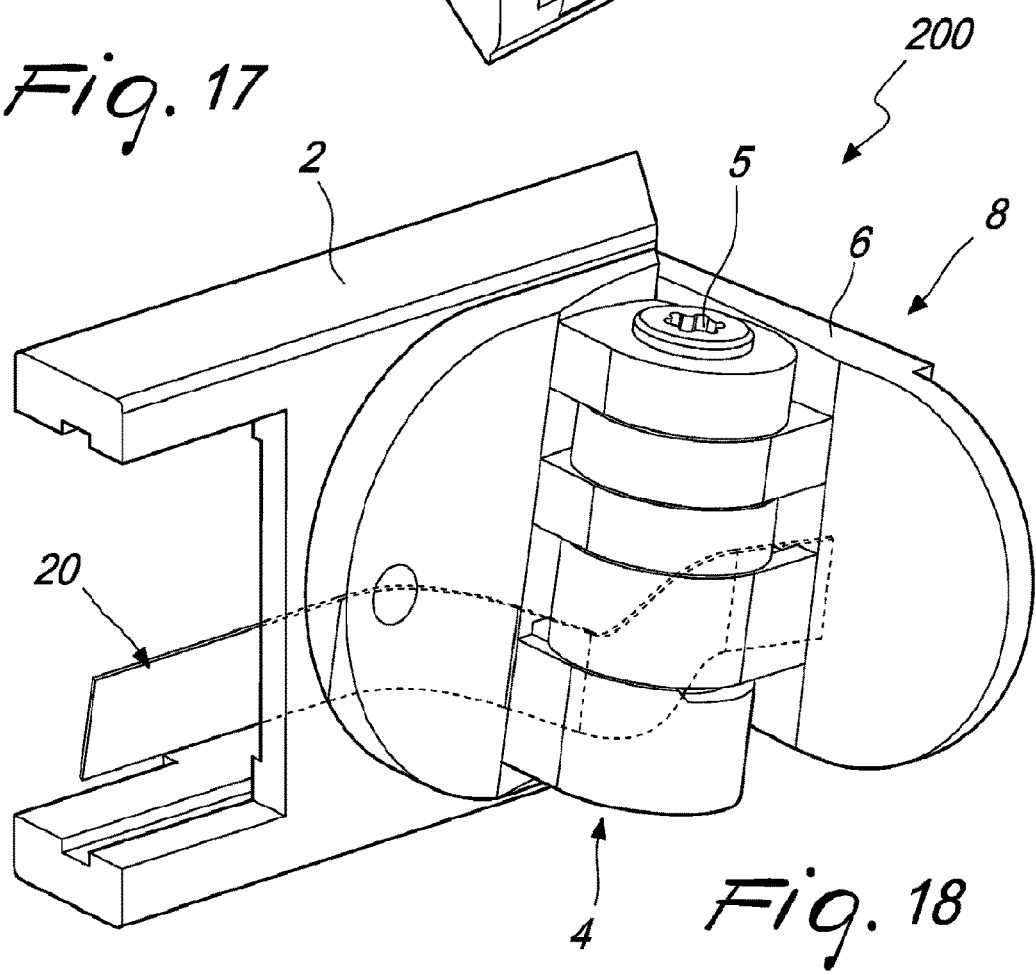
FIG. 18 is a further perspective view of the hinge of FIG. 16.

FIGS. 17 and 18 show the fourth embodiment of the hinge according to the disclosure, generally designated by the reference numeral 200, in which the rings 4, 8 respectively have the following thickness: the first three rings from the top downward have the same thickness and in particular said rings are respectively the first two from the top of the first hinge body 2 and the first one from the top of the second hinge body 6, as well as the third from the top of the first hinge body 2 and the second from the top of the second hinge body 6.

Figure 19:
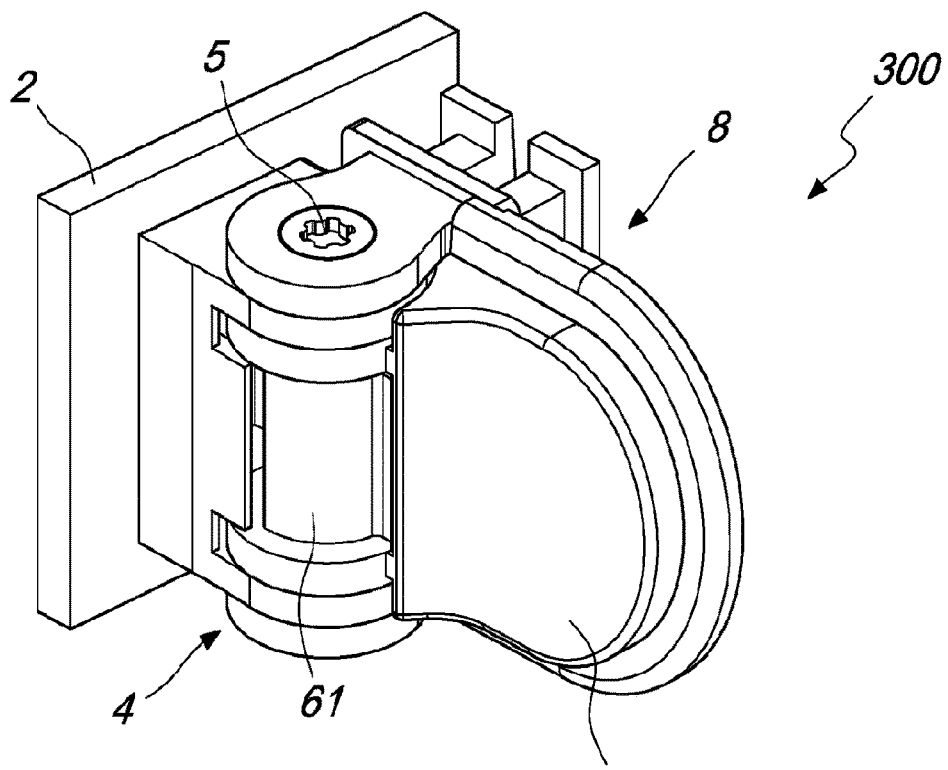
FIG. 19 is a front perspective view of a fifth embodiment of the hinge according to the disclosure.
Figure 20:
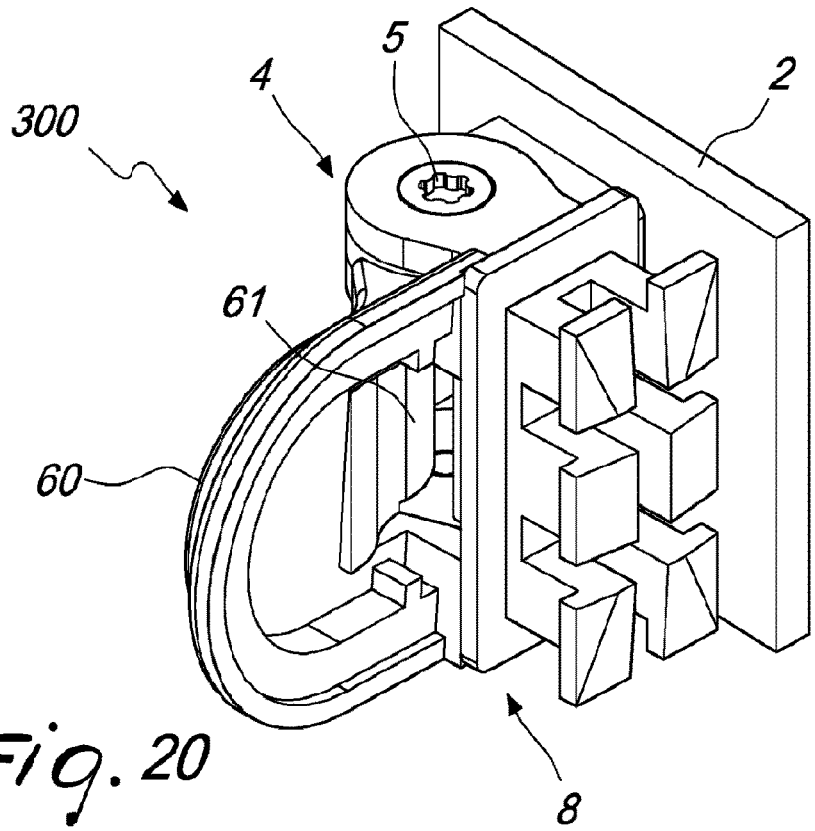
FIG. 20 is a rear perspective view of the fifth embodiment of the hinge according to the disclosure.
Figure 21:
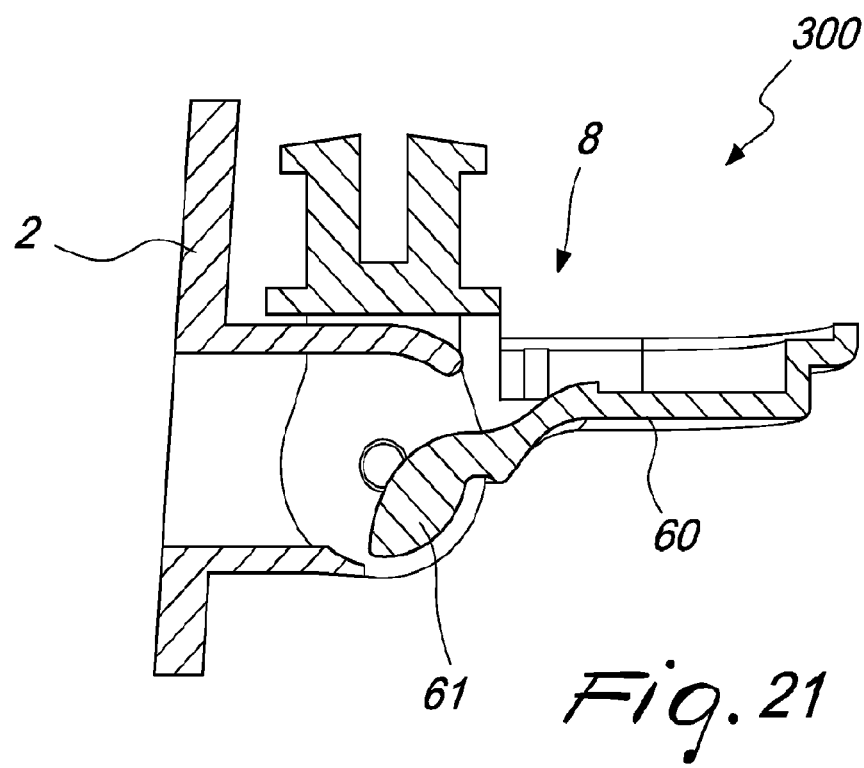
FIG. 21 is a longitudinal sectional view of the hinge of FIGS. 19 and 20 in the open condition.
Figure 22:
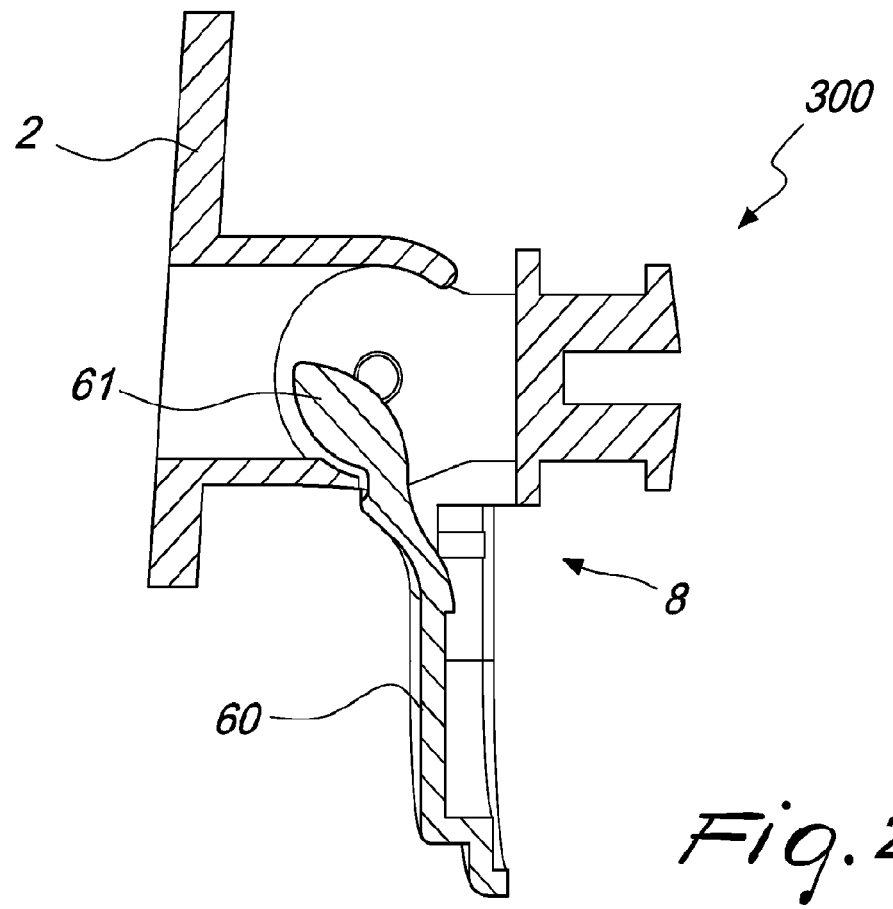
FIG. 22 is a longitudinal sectional view of the hinge of FIGS. 19 and 20 in the closed condition.

FIG. 19 is a perspective view of the fifth embodiment of the hinge according to the disclosure, generally designated by the reference numeral 300, in which there is a covering element 60, which is contoured with an arc-like part, for partially covering the concentric rings of the hinge. The arc-like part ends with an ogive shape 61 in cross-section, which rotates within the first hinge body 2.

Figure 23:
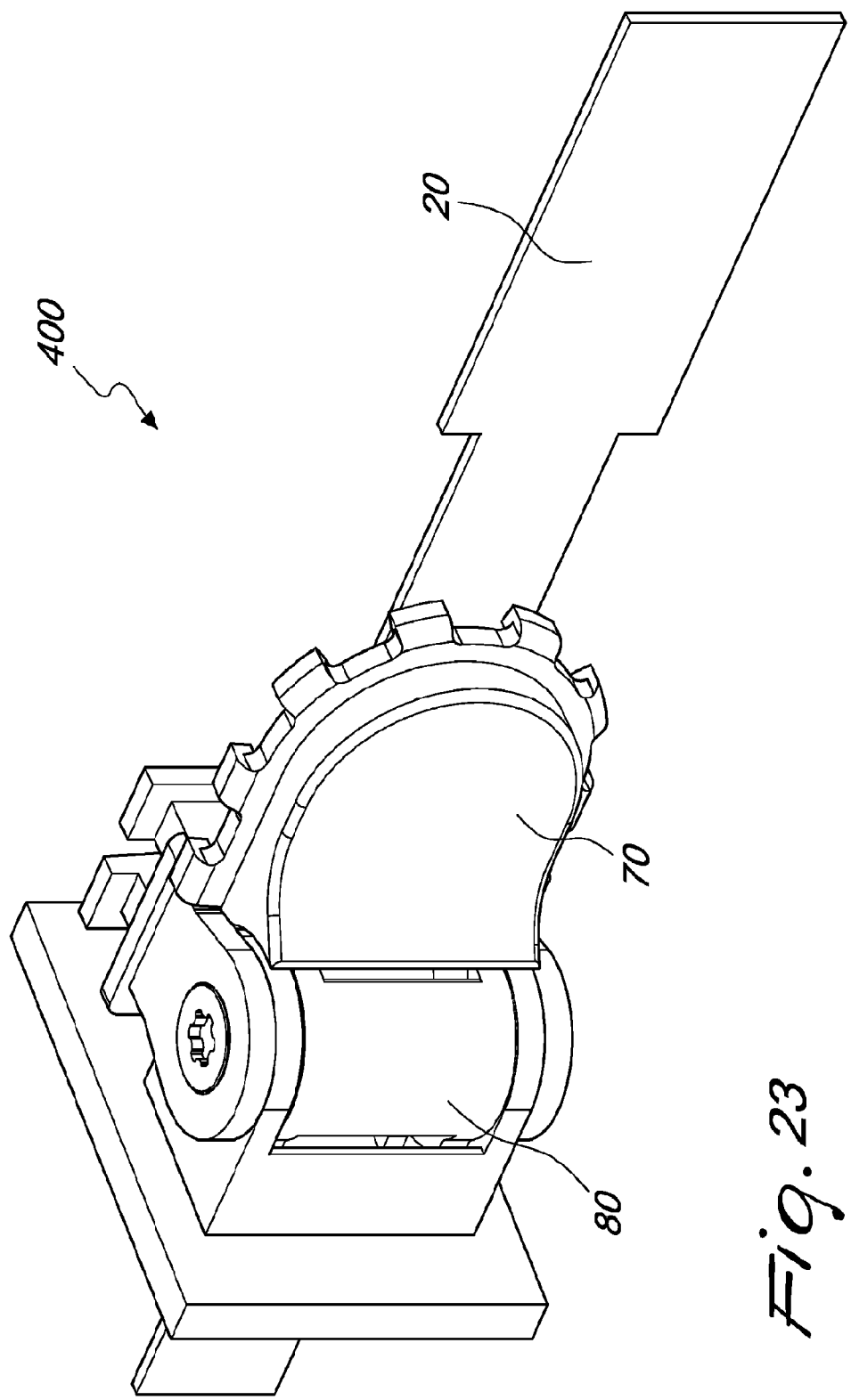
FIG. 23 is a perspective view of a sixth embodiment of the hinge according to the disclosure.
Figure 24:
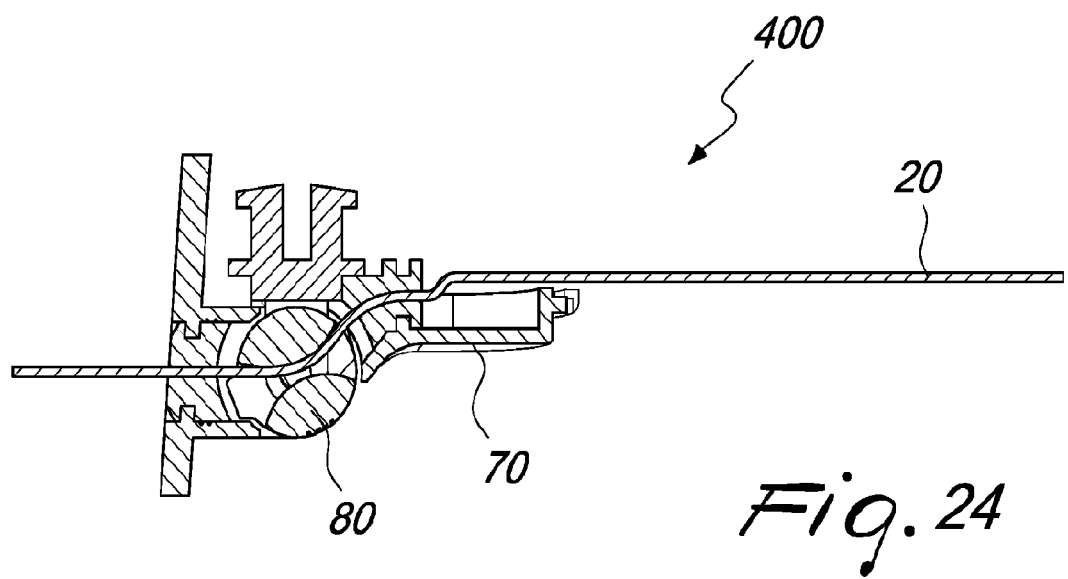
FIG. 24 is a longitudinal sectional view of the hinge of FIG. 23 in the open condition.
Figure 25:
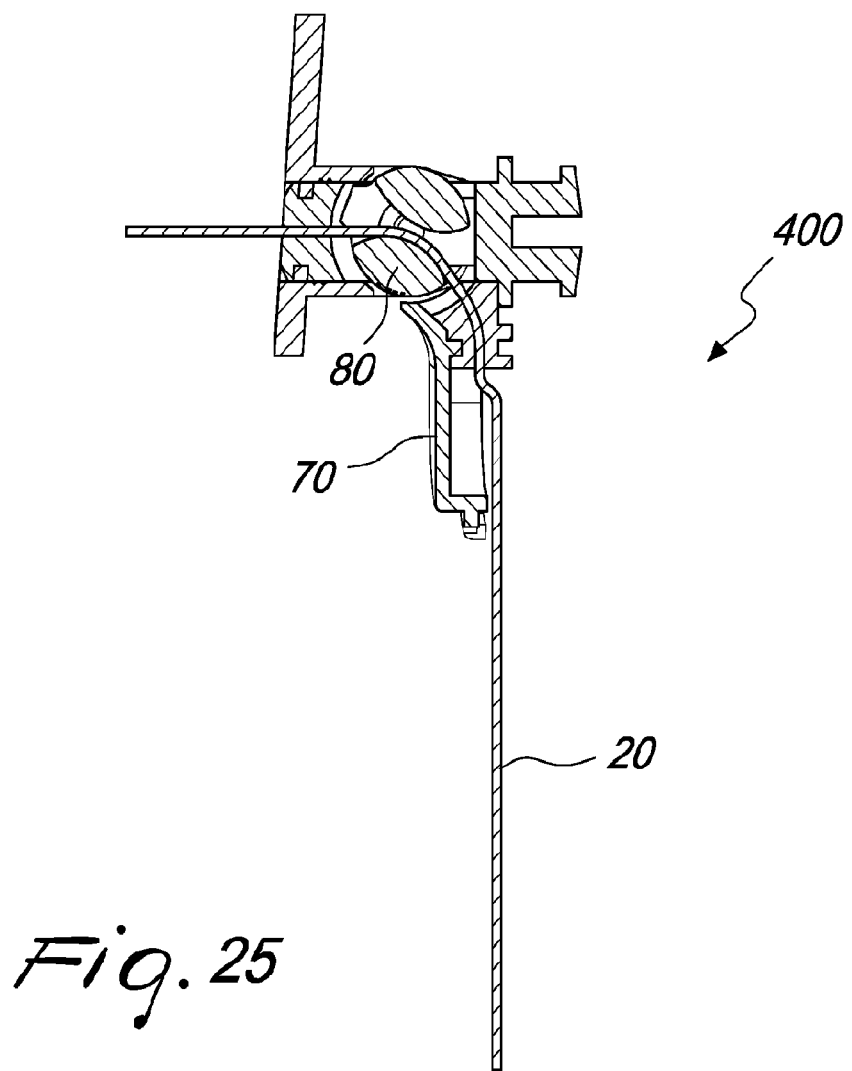
FIG. 25 is a longitudinal sectional view of the hinge of FIG. 23 in the closed condition.

FIGS. 23-25 show the sixth embodiment of the hinge according to the disclosure, designated generally by the reference numeral 400, in which the covering element, designated in this case by 70, is not extended within the hinge body 2 as in the fifth embodiment but there is a cylinder 80 which is contoured so as to allow the passage of the cable 20. The cylinder 80 is inserted between the concentric rings and the cable 20 passes through it, resting against curved surfaces formed inside the cylinder 80. The cable 20 rests, within the cylinder, against two different mutually opposite curved surfaces in the open condition (active position, with an angle of 0°) and in the closed condition (inactive position, at 90° with respect to the open position). The temple 3 is furthermore provided with an extra flex by an angle which can vary up to a maximum of 90° with respect to the active position, of 0°. Preferably, said extra flex is an angle comprised between 1 and 22° with respect to the active position of 0°.

Conveniently, for all of the embodiments described above it is possible to provide a cavity which is adapted to accommodate sensors and/or emitters 30 in order to provide status notifications of the device to the user. These notifications can be, by way of example, a battery charge indication, a Bluetooth® connection indication, an indication of use by the user and/or of interaction of the user with the device.

Such sensors and/or emitters may be, by way of non-limiting example, temperature sensors, pressure sensors or more generically environmental sensors.

In the particular case of battery charge indication, an LED emitter 30 is arranged on the temple 3 at the rings 4 of the first hinge body and is adapted to provide a luminous indication for notification to the user.

The rings 4 and 8 of the first and second hinge bodies may furthermore have mutually different thickness.

Finally, it is possible to provide a rubber gasket 35 which is adapted to protect the flexible cable 20 from atmospheric agents. Said gasket 35 acts as a plug (with a passage hole for the cable) for the opening through which the flexible cable 20 passes.

In practice it has been found that the hinge for electronic eyeglasses according to the disclosure fully achieves the intended aim and objects, since it allows to define a receptacle for the power supply/data cable, partially within the temple 3 and through the hinge 1, allowing to conveniently conceal the cable and prevent damage thereto by virtue of a passage without jamming inside the temple 3 through the hinge 1, and furthermore allows to avoid the cable becoming worn due to repeated openings and closures of the temple 3 on the front 7.

The hinge thus conceived is susceptible of numerous modifications and variations, all of which are within the scope of the accompanying claims.

All the details may furthermore be replaced with other technically equivalent elements.

In practice, the materials used, as well as the contingent shapes and dimensions, may be any according to the requirements and the state of the art.

The invention claimed is:

1. A hinge for electronic eyeglasses comprising:
a first hinge body adapted to be connected to a temple of a pair of eyeglasses;
a second hinge body adapted to be connected to a front of the eyeglasses; and
a power supply/data cable adapted to be inserted within said temple, in order to pass through said first hinge body and said second hinge body and be redirected toward said front, and
wherein said first hinge body is constituted by a plurality of mutually spaced rings, which are adapted to intersect a plurality of rings of said second hinge body, in order to form a plurality of concentric rings, at least some of said concentric rings being adapted to be mutually connected by means of a retention pin, wherein said power supply/data cable is shaped with a first part with a profile which blends with a second part with a step so that said second part is in a raised position with respect to said first part.

2. The hinge according to claim 1, wherein at least three of said concentric rings are adapted to be mutually connected by said retention pin.

3. The hinge according to claim 1, wherein said power supply/data cable is adapted to be inserted in a cavity formed within said temple of the eyeglasses, in order to pass through said hinge rings, passing behind said retention pin, adjacent to said temple, in order to be guided to a cavity formed at said front.

4. The hinge according to claim 1, wherein said power supply/data cable is adapted to be inserted in a cavity formed within said temple of the eyeglasses, in order to pass through said hinge rings, passing around said retention pin, in order to be guided to a cavity formed at said front.

5. The hinge according to claim 1, wherein said power supply/data cable is shaped with said first part with a profile which blends with said second part with a step so that said second part is in a raised position with respect to said first part, an initial portion of the first part of the cable being contoured with a profile that has a horizontal part which blends with a descending part.

6. The hinge according to claim 5, wherein said initial portion of said first part of the power supply/data cable is adapted to be arranged at an upper region of said temple, in order to be directed downward with said descending portion and pass at the lower ring of said plurality of concentric rings of said first hinge body, passing behind said retention pin, adjacent to said temple.

7. The hinge according to claim 4, wherein said hinge rings are arranged in communication with the cavity formed inside said temple, so as to allow the passage of the power supply/data cable from said temple to said concentric rings of the hinge, passing around said retention pin.

8. The hinge according to claim 3, wherein said hinge rings are arranged in communication with the cavity formed inside said temple, so as to allow the passage of the power supply/data cable from said temple to said concentric rings of the hinge, passing behind said retention pin, adjacent to said temple.

9. The hinge according to claim 1, wherein said first part of the power supply/data cable is adapted to be arranged at an upper region of said temple, said second part being adapted to be inserted at an intermediate ring of said concentric rings of the first hinge body, in order to pass around said retention pin.

10. The hinge according to claim 1, further comprising a cavity arranged on the temple at the concentric rings of the first hinge body and adapted to accommodate sensors and/or emitters in order to emit notifications to the user.

11. The hinge according to claim 10, wherein said notifications to the user are provided by an LED emitter.

12. The hinge according to claim 1, wherein said concentric rings have mutually identical thickness.

13. The hinge according to claim 1, wherein said concentric rings have mutually different thickness.

14. The hinge according to claim 1, further comprising a cylinder adapted to be inserted between said concentric rings, said power supply/data cable being adapted to pass through said cylinder, resting against distinct and facing regions having a curved profile, depending on whether the hinge is in an open or closed condition.

* * * * *